March 25, 1924.
J. J. RUNCK
1,488,063
AGRICULTURAL IMPLEMENT
Filed Nov. 21, 1918
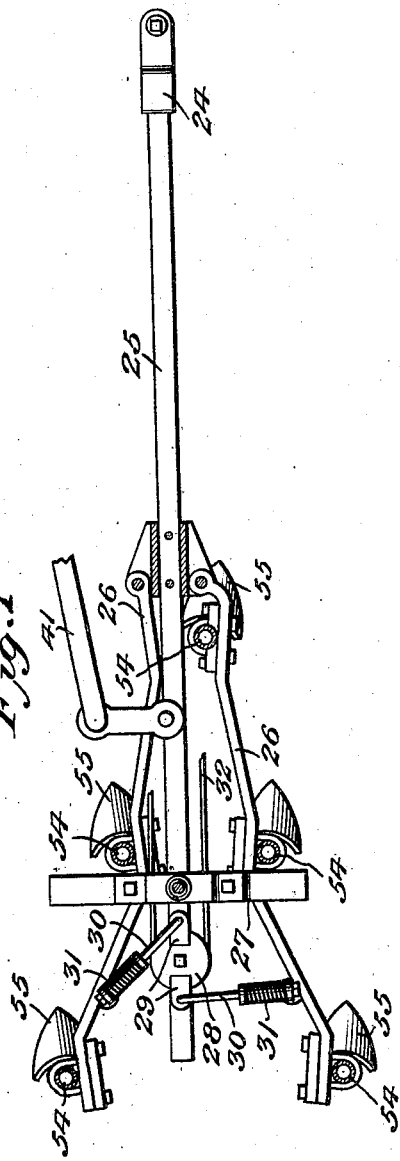
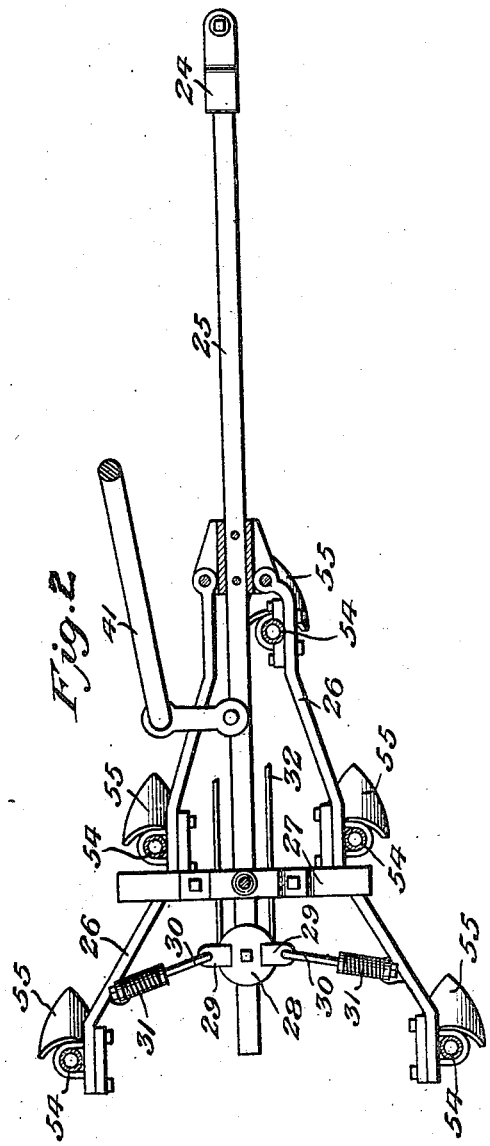
Witnesses
Edwin G. McKee
Inventor
John J. Runck
By Victor J. Evans
Attorney Patented Mar. 25, 1924.

1,488,063

UNITED STATES PATENT OFFICE.

JOHN J. RUNCK, OF REPUBLICAN CITY, NEBRASKA.

AGRICULTURAL IMPLEMENT.

Application filed November 21, 1918. Serial No. 263,611.

*To all whom it may concern:*

Be it known that I, JOHN J. RUNCK, a citizen of the United States, residing at Republican City, in the county of Harlan and State of Nebraska, have invented new and useful Improvements in Agricultural Implements, of which the following is a specification.

This invention relates to the improvements in agricultural implements, the general object of the invention being to provide means for adjusting the gang arms of the implement so that it can be used for cultivating plants planted in wide or narrow rows.

With the above and other objects in view, as will be hereinafter apparent, the invention consists in general of certain novel details of construction and combination of parts hereinafter fully described, illustrated in the accompanying drawings, and specifically claimed.

In the accompanying drawings, like characters of reference indicate like parts in the several views, and:—

Figure 1 is a plane view of the drag beam and the gang arms showing the arms in retracted position.

Figure 2 is a similar view but showing the arms in expanded position.

In these views 25 indicates one of the drag beams of an implement which is adapted to be fastened to the implement by a socket member 24. The gang arms are shown at 26 and these arms are pivotally attached to the beam at their forward ends. The arms are slidably supported by the cross pieces 27 which are attached to the beam. A pulley 28 is carried by the rear end of the beam and the pulley is provided with a pair of clips 29 which are diametrically arranged on the pulley. Bars 30 connect these clips with the arms 26 so that when the pulley is rotated the bars will move the arms outwardly or inwardly according to the direction of movement of the pulley. The bars 30 are yieldably connected with the arms by the springs 31. The pulley is actuated by means of a cable 32 which passes around the same and which is attached to any suitable form of actuating mechanism.

From the foregoing it will be seen by rotating the pulley by means of the cable the gang arms can be contracted or expanded so as to adjust the shovels 55 to work in narrow or wide rows. The seed spouts are shown at 54 and the means for swinging the beam is partially shown at 41.

While I have herein shown and described a preferred embodiment of my invention, I would have it understood that changes may be made in the form, proportion and construction of the several parts without departing from the spirit of my invention and within the scope of the appended claim.

Having thus described my invention, I claim:

A wheeled cultivator gang structure comprising a drag beam, a pair of gang arms pivotally connected with the beam, cross pieces on the beam for movably supporting the arms, a pulley having a vertical axis mounted on the beam, links connecting the pulley with the gang arms, spring means on said links for permitting yielding movement of the arms, an actuating cable passing around said pulley and in frictional engagement therewith.

In testimony whereof I affix my signature.

JOHN J. RUNCK.